United States Patent
Tsai

(10) Patent No.: US 8,392,287 B2
(45) Date of Patent: Mar. 5, 2013

(54) SYSTEM AND METHOD FOR GENERATING SHOPPING LIST

(75) Inventor: Teng-Yu Tsai, New Taipei (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 28 days.

(21) Appl. No.: 13/186,376

(22) Filed: Jul. 19, 2011

(65) Prior Publication Data
US 2012/0101893 A1  Apr. 26, 2012

(30) Foreign Application Priority Data
Oct. 20, 2010  (TW) .................................. 99135839

(51) Int. Cl.
G06Q 30/00 (2012.01)
(52) U.S. Cl. ..................... 705/26.8; 705/26.1
(58) Field of Classification Search .............. 705/26.1, 705/26.8, 27.1
See application file for complete search history.

(56) References Cited

U.S. PATENT DOCUMENTS

| | | | |
|---|---|---|---|
| 2002/0059311 A1* | 5/2002 | Nishina | 707/200 |
| 2008/0277168 A1* | 11/2008 | Doerwald | 177/25.15 |
| 2009/0106115 A1* | 4/2009 | James et al. | 705/14 |
| 2010/0153209 A1* | 6/2010 | de Rubertis et al. | 705/14.51 |

OTHER PUBLICATIONS

Anonymous, "Zebra Kiosk Print Station Provides Rapid Deployment for Self Service Applications," PR Newswire, Jul. 6, 2009.*

* cited by examiner

Primary Examiner — Brandy A Zukanovich
(74) Attorney, Agent, or Firm — Altis Law Group, Inc.

(57) ABSTRACT

A shopping list generating system includes a coupon obtaining module, a keyword generator, a recipe obtaining module, and a shopping list generator. The coupon obtaining module obtains coupon information about one or more particular coupons from a coupon database. The keyword generator generates one or more keywords according to particular coupon information about the one or more particular coupons. The recipe obtaining module obtains recipe information about one or more recipes by querying the recipe database using the one or more keywords, and the shopping list generator generates a shopping list of ingredients according to the recipe information about the one or more recipes.

10 Claims, 5 Drawing Sheets

Fried Chicken

RECIPE

Ingredients

30 saltine crackers
2 tablespoons all-purpose flour
2 tablespoons dry potato flakes
1 teaspoon seasoned salt
1/2 teaspoon ground black pepper
1 egg
1/4 cup vegetable oil
6 skinless, boneless chicken breast halves

Directions

1. Place crackers in a large resalable plastic bag; seal bag and crush crackers until they are coarse crumbs. Add flour, potato flakes, seasoned salt, and pepper to bag and mix well.
2. Beat egg in a shallow dish or bowl; heat oil in a large skillet over medium high heat.
3. One by one, dredge chicken pieces in egg beat, then place in bag with crumb mixture, seal bag and shake to coat.
4. Reduce heat to medium and cook coated chicken in skillet for 15 to 20 minutes, turning frequently, until golden brown and juices run clear.

FIG. 2

Shopping List 2011.6.16 16:06:37

30 saltine crackers
2 tablespoons all-purpose flour
2 tablespoons dry potato flakes
1 teaspoon seasoned salt
1/2 teaspoon ground black pepper
1 egg
1/4 cup vegetable oil
6 skinless, boneless chicken breast halves
3 tablespoons vegetable oil
1 onion, chopped
2 pounds cubed beef stew meat
1/4 cup soy sauce
1/4 cup Worcestershire sauce
1 teaspoon garlic powder
1 teaspoon salt
1 teaspoon ground black pepper
1 (.75 ounce) packet dry brown gravy mix Print

FIG. 4

SYSTEM AND METHOD FOR GENERATING SHOPPING LIST

BACKGROUND

1. Technical Field

The disclosure generally relates to a system and method for generating a shopping list in an electronic device.

2. Description of Related Art

A customer may get coupons from various sources, including newspapers and the Internet, with web sites offering free printable grocery coupons that can be printed at home and be used at retail stores. For example, a customer may get information about coupons for certain ingredients from COUPONS.COM®. If the customer wants to cook food using these ingredients, he or she may need to spend a bit of time to think or search what food can be cooked with these ingredients or what other ingredients are needed if he or she would like to cook this food. A simple way is needed to provide the customer with a useful, productive shopping list of ingredients.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

FIG. 2 is an example of a recipe according to one embodiment.

FIG. 4 is an example of a shopping list generated by the shopping list generating system of FIG. 1.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or Assembly. One or more software instructions in the modules may be embedded in firmware, such as EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
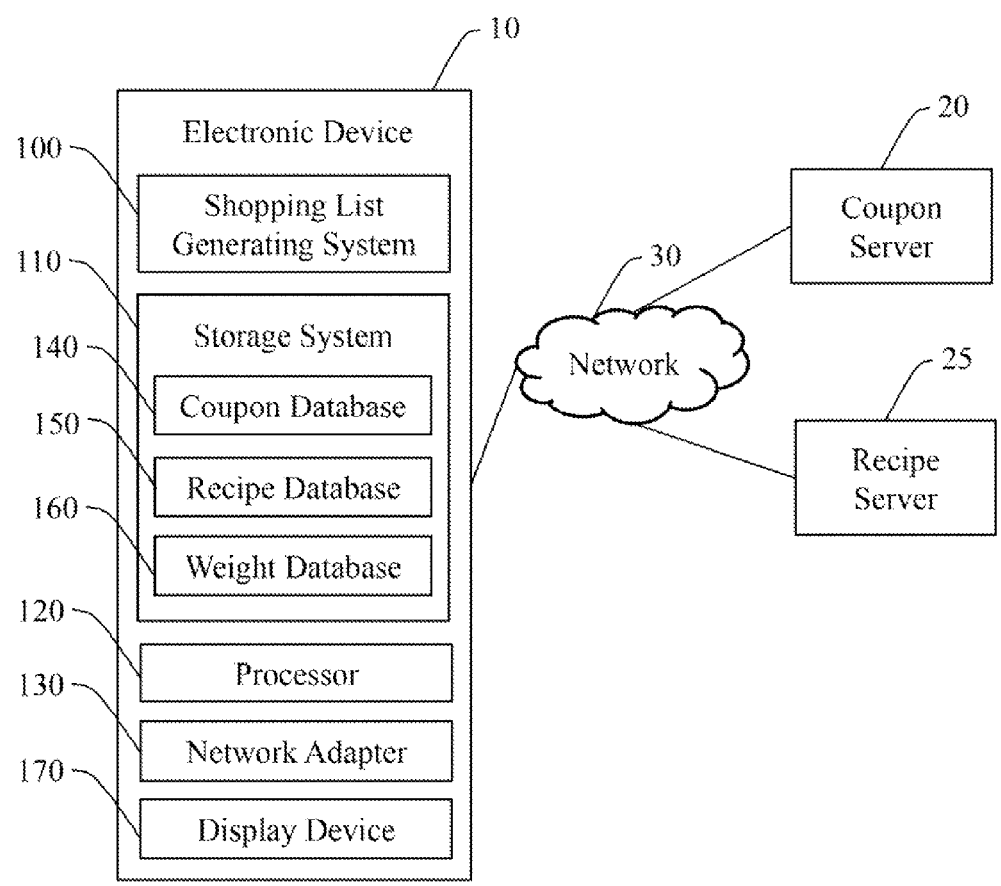
FIG. 1 is a schematic diagram of one embodiment of an electronic device including a shopping list generating system.

FIG. 1 is a schematic diagram of one embodiment of an electronic device 10. In the embodiment, the electronic device 10 may include a shopping list generating system 100, a storage system 110, at least one processor 120, a network adapter 130, and a display device 170. The storage system 110 includes a coupon database 140, a recipe database 150, and a weight database 160. The electronic device 10 implements the functions of the shopping list generating system 100. The shopping list generating system 100 may communicate with a coupon server 20 and a recipe server 25 via a network 30 and download information about coupons and recipes from them. The electronic device 10 may be a desktop computer, a flat panel computer, a PDA or a smart phone.

In one embodiment, the storage system 110 may be a magnetic or an optical storage system, such as a hard disk drive, an optical drive, or a tape drive. The network adapter 130 may be a network interface card using a specific physical layer and data link layer standard such Ethernet or Wi-Fi. The network 30 may be a local area network (LAN) or a wide area network (WAN), such as Internet. The display device 170 is configured with a display screen, such as a liquid crystal display (LCD) or a cathode-ray tube (CRT) display.

The coupon database 140 stores information about coupons. A coupon can be exchanged for financial discount or rebate when purchasing a product, for example, ingredients for food. A coupon is always associated with an expiration date or time. When the coupon expires, it will lose efficacy on its own. Information about coupons may be acquired from the coupon server 20 and then can be stored in the coupon database 140. The coupon server 20 may be provided by a web site, such as COUPONS.COM®.

The recipe database 150 stores information about recipes. Information about a recipe may include a set of ingredients and directions for cooking. FIG. 2 presents an example of a recipe. The presented recipe includes a set of ingredients and directions for cooking a fried chicken.

In one embodiment, each coupon is associated with a category. For example, a coupon of chicken breast may be associated with a category named "meat". In order to catalog information about coupons according to a preference of a user, a weight value is defined for each category. The greater the weight value of a category is, the more frequently the user picks up coupons from that category. The weight database 160 may store weight values for those categories.

Figure 3:
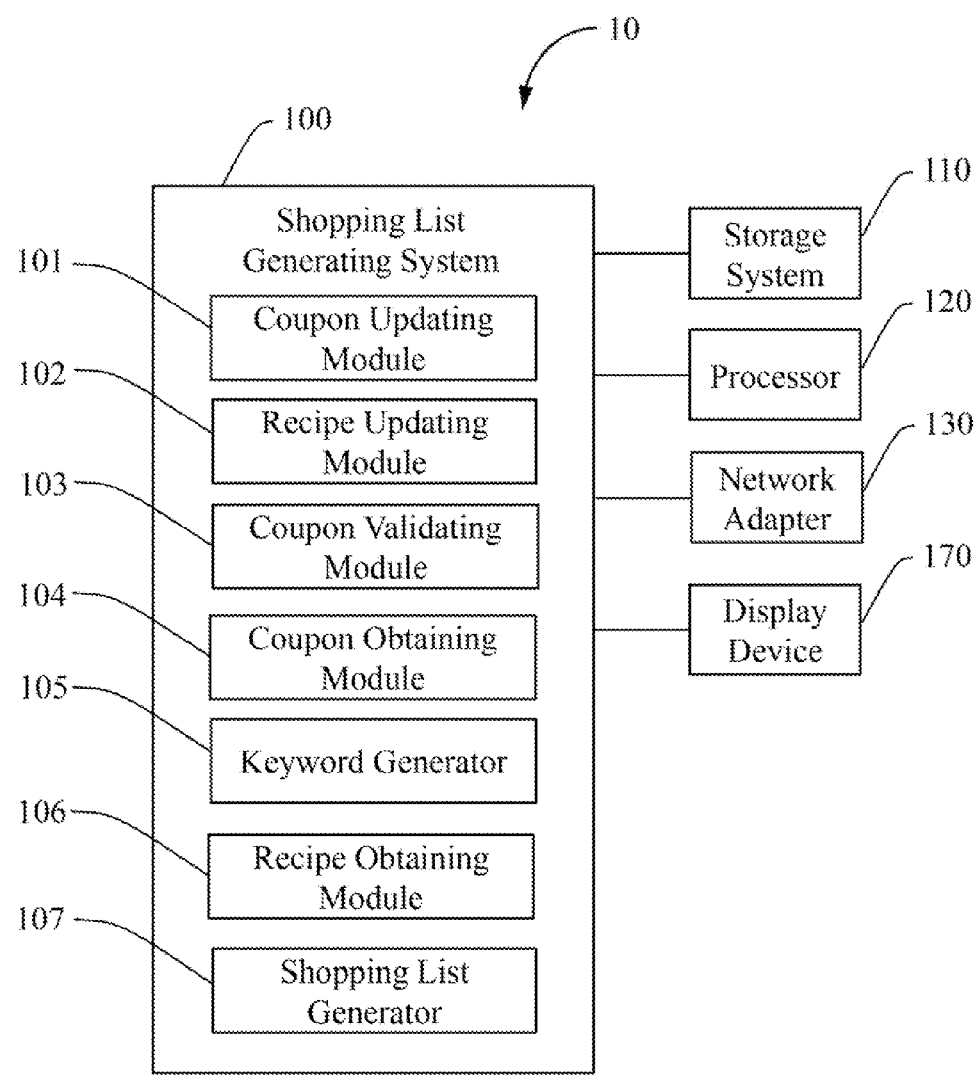
FIG. 3 is a schematic diagram of one embodiment of function modules of the shopping list generating system of FIG. 1.

FIG. 3 is a schematic diagram of one embodiment of the function modules of the shopping list generating system 100. In the embodiment, the shopping list generating system 100 includes a coupon updating module 101, a recipe updating module 102, a coupon validating module 103, a coupon obtaining module 104, a keyword generator 105, a recipe obtaining module 106 and a shopping list generator 107. Each of the modules 101-107 may be a software program including one or more computerized instructions that are stored in the storage system 110 and executed by the processor 120.

The coupon updating module 101 may monitor for an event associated with updating information in the coupon database 140. An event can be, for example, a timer triggered every a few minutes or hours. Another event can be detection of a user selection in a user interface included in the shopping list generating system 100. Upon detection of that event, the coupon updating module 101 may download new information about one or more coupons from the coupon server 20, and update the coupon database 140 with the new information about the one or more coupons.

The recipe updating module 102 may monitor for an event associated with updating information in the recipe database 150. When the recipe updating module 102 detects that event, the recipe updating module 102 may download new information about one or more recipes from a recipe server 25, and update the recipe database 150 with the new information about the one or more recipes.

The coupon validating module 103 may determine whether information about each coupon in the coupon database 140 has expired. In response to determining the expiry or otherwise of a coupon, the coupon validating module 103 may delete information about that coupon from the coupon database 140.

The coupon obtaining module 104 may display information about a plurality of coupons from the coupon database 140 on a display screen of the display device 170. In one embodiment, the coupon obtaining module 104 may group information about the plurality of coupons in corresponding categories. The coupon obtaining module 104 may further sort the grouped information about the plurality of coupons according to weight value associated with each of the categories. The coupon obtaining module 104 may select information about one or more particular coupons according to a user selection in a user interface. When a coupon is selected, the coupon obtaining module may determine category of that coupon, and increase weight value of the determined category in the weight database 160.

The keyword generator 105 may generate one or more keywords according to information about the one or more particular coupons.

The recipe obtaining module 106 may obtain information about one or more recipes by querying the recipe database 150 using the one or more keywords.

The shopping list generator 107 may generate a shopping list of ingredients according to information about the one or more recipes. FIG. 4 presents an example of a shopping list generated by the shopping list generator 107. The presented shopping list includes a set of ingredients, such as crackers, dry potato flakes, and soy sauce. The shopping list generator 107 may display the shopping list on a display screen of the display device 170 or further print the shopping list via a printer (not shown) coupled to the electronic device 10.

Figure 5:
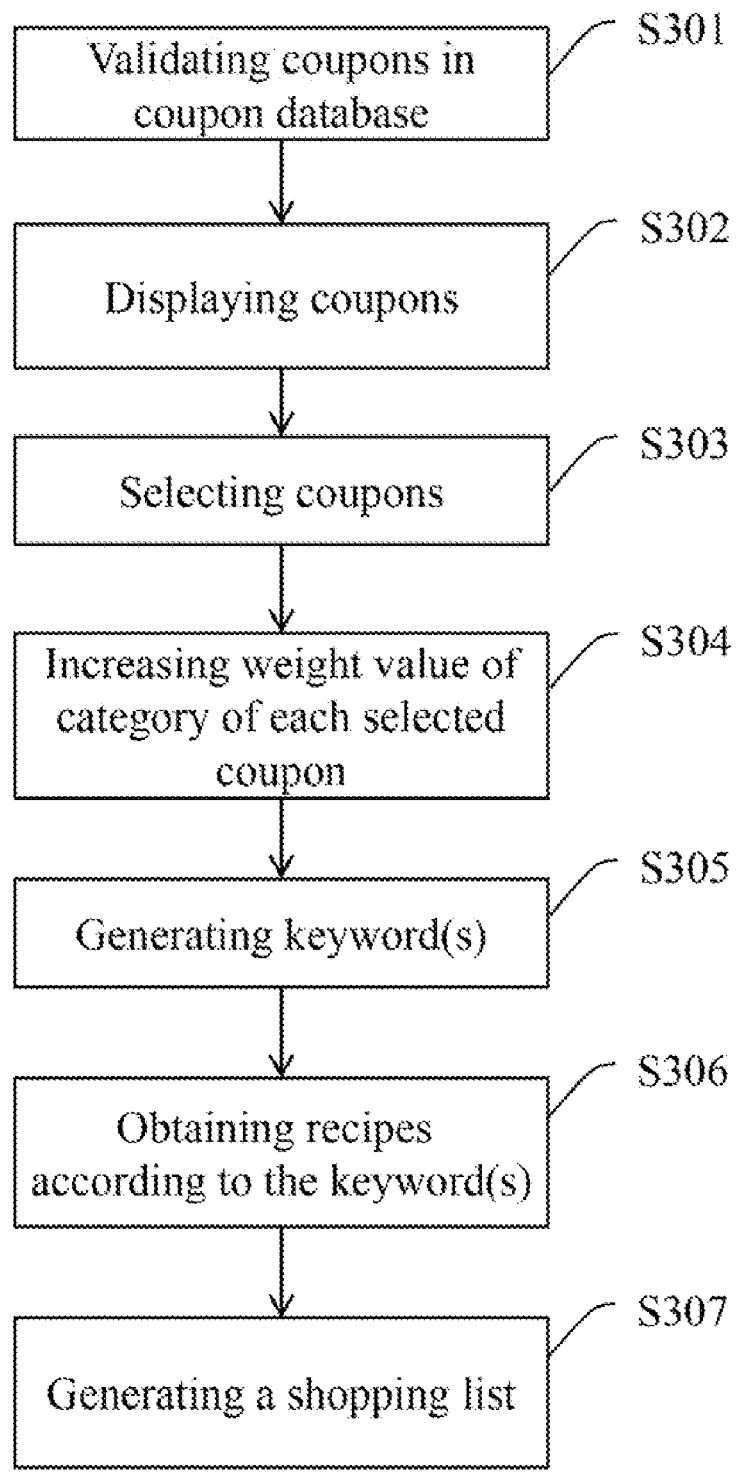
FIG. 5 is an operational flow diagram representing an exemplary embodiment of a method for generating a shopping list.

FIG. 5 is a flowchart illustrating one embodiment of a method of generating a shopping list using the shopping list generating system of FIG. 1. The method may include the following steps.

In step S301, the coupon validating module 103 determines whether information about each coupon in the coupon database 140 has expired. In response to determining the expiry or otherwise of a coupon, the coupon validating module 103 deletes information about that coupon from the coupon database 140.

In step S302, the coupon obtaining module 104 displays information about a plurality of coupons from the coupon database 140 on a display screen of the display device 170. In one embodiment, the coupon obtaining module 104 groups information about the plurality of coupons in corresponding categories. The coupon obtaining module 104 further sorts the grouped information about the plurality of coupons according to weight value associated with each of the categories.

In step S303, the coupon obtaining module 104 selects information about one or more particular coupons according to a selection by a user in a user interface.

In step S304, when a coupon is selected, the coupon obtaining module determines category of that coupon, and then increases weight value of the determined category in the weight database 160.

In step S305, the keyword generator 105 generates one or more keywords according to information about the one or more particular coupons.

In step S306, the recipe obtaining module 106 obtains information about one or more recipes by querying the recipe database 150 using the one or more keywords.

In step S307, the shopping list generator 107 generates a shopping list of ingredients according to information about the one or more recipes.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. An electronic device, comprising:
   a storage system comprising a coupon database and a recipe database, wherein the coupon database stores a plurality of coupons, the recipe database stores a plurality of recipes, and each of the plurality of recipes comprises a list of ingredients; each of the plurality of coupons is associated with a category and each of the categories is associated with a weight value; the storage system further comprises a weight database storing the weight values for the categories;
   at least one processor;
   one or more programs being stored in the storage system and executable by the at least one processor, the one or more programs comprising:
   a coupon obtaining module adapted to obtain the plurality of coupons from the coupon database, group the plurality of coupons according to the categories of the plurality of coupons, retrieve the weight value of the categories from the weight database, sort the grouped plurality of coupons according to the weight values of the categories, display the sorted plurality of coupons on a display screen of the electronic device, and select at least one coupon from the displayed plurality of coupons according to a user selection in a user interface; the coupon obtaining module is further adapted to increase weight value(s) of category(s) associated with the at least one selected coupon and update the weight database with the increased weight value(s);
   a keyword generator adapted to generate one or more keywords according to the at least one selected coupon;
   a recipe obtaining module adapted to obtain one or more recipes by querying the recipe database using the one or more keywords; and
   a shopping list generator adapted to generate a shopping list of ingredients according to the one or more obtained recipes.

2. The electronic device of claim 1, further comprising a coupon updating module adapted to detect an event associated with triggering an update of the coupon database, download updated coupon(s) from a coupon server, and update the coupon database with the updated coupon(s) in response to the detected event.

3. The electronic device of claim 1, further comprising a recipe updating module adapted to detect an event associated an update of the recipe database, download updated recipe(s) from a recipe server, and update the recipe database with the updated recipe(s) in response to the detected event.

4. The electronic device of claim 1, wherein each of the plurality of coupons is associated with an expiration time, and the expiration time is stored in the coupon database.

5. The electronic device of claim 4, further comprising a coupon validating module adapted to determine whether any of the plurality of coupons has expired, and in response to a determination that one of the plurality of coupons has expired, delete the the one of the plurality of coupons from the coupon database.

6. A computer-implemented method for generating a shopping list in an electronic device, comprising:
   providing a coupon database that stores a plurality of coupons, each of the plurality of coupons is associated with a category and each of the categories is associated with a weight value;
   providing a weight database that stores the weight values for the categories;
   providing a recipe database that stores a plurality of recipes, each of the plurality of recipes comprises a list of ingredients;
   obtaining the plurality of coupons from the coupon database;
   grouping the plurality of coupons according to the categories of the plurality of coupons;
   retrieving the weight value of the categories from the weight database;
   sorting the grouped plurality of coupons according to the weight values of the categories;
   displaying the sorted plurality of coupons on a display screen of the electronic device;
   selecting at least one coupon from the displayed plurality of coupons according to a user selection in a user interface;
   increasing weight value(s) of category(s) associated with the at least one selected coupon and updating the weight database with the increased weight value(s);
   generating one or more keywords according to the at least one selected coupon;
   determining one or more recipes by querying the recipe database using the one or more keywords; and
   generating a shopping list of ingredients according to the one or more determined recipes.

7. The method of claim 6, wherein the providing the coupon database further comprises associating each of the plurality of coupons with an expiration time.

8. The method of claim 7, further comprising:
   determining whether any of the plurality of coupons has expired; and
   when it is determined that one of the plurality of coupons has been determined to be expired, deleting the one of the plurality of coupons from the coupon database.

9. The method of claim 6, further comprising:
   detecting an event associated with triggering an update of the coupon database; and
   downloading updated coupon(s) from a coupon server and updating the coupon database with the updated coupon(s) in response to the detected event.

10. The method of claim 6, further comprising:
    detecting an event associated with an update of the recipe database; and
    downloading updated recipe(s) from a recipe server and updating the recipe database with the updated recipe(s) in response to the detected event.

* * * * *